No. 773,333. PATENTED OCT. 25, 1904.
A. P. MORROW.
COASTER AND BRAKE DEVICE.
APPLICATION FILED AUG. 1, 1902.
NO MODEL. 2 SHEETS—SHEET 1.
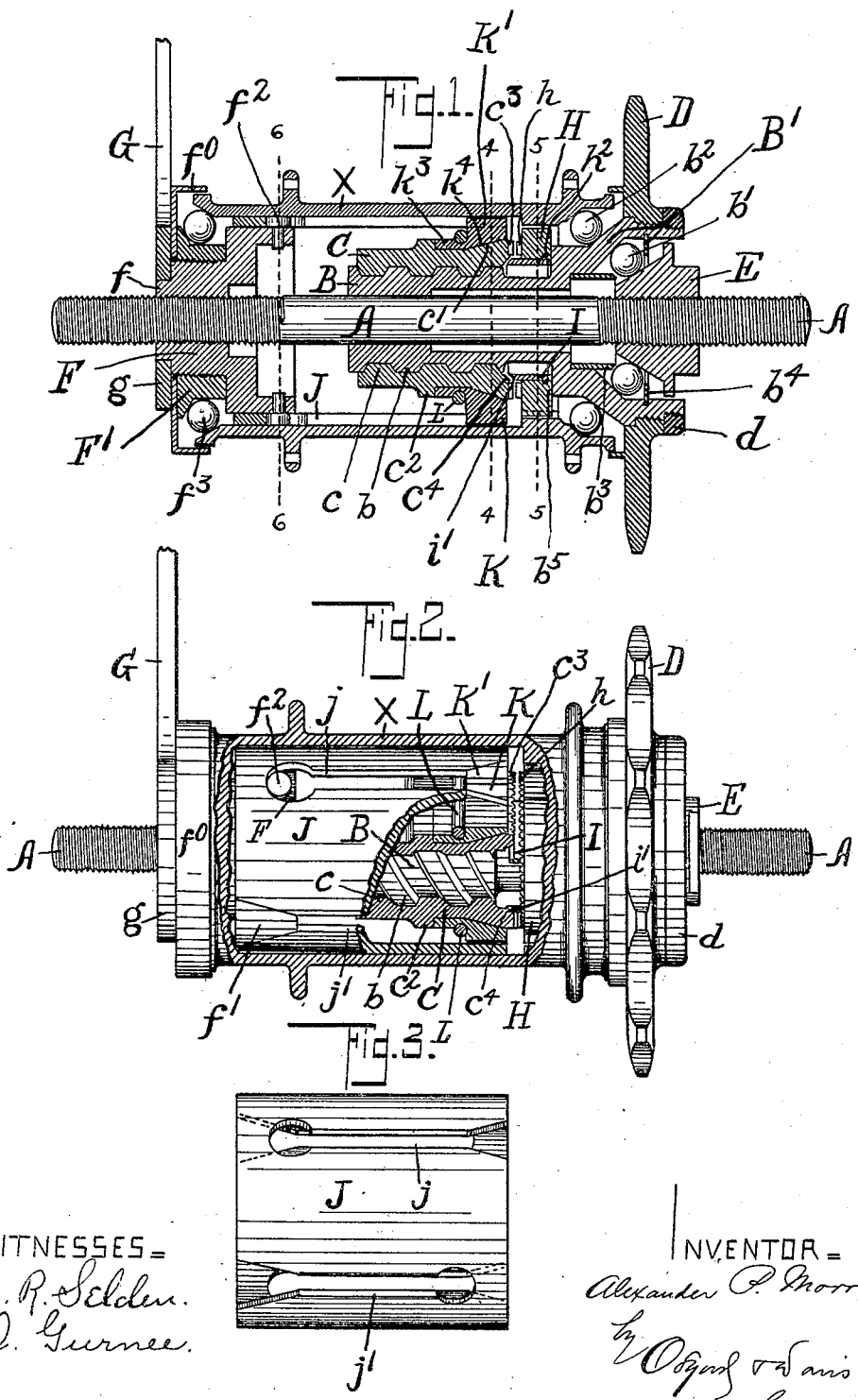
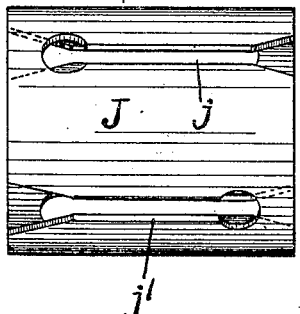
WITNESSES=
A. R. Selden.
D. Gurnee.
INVENTOR=
Alexander P. Morrow
by Osgood & Davis
his Attys No. 773,333. PATENTED OCT. 25, 1904.
A. P. MORROW.
COASTER AND BRAKE DEVICE.
APPLICATION FILED AUG. 1, 1902.
NO MODEL. 2 SHEETS—SHEET 2.
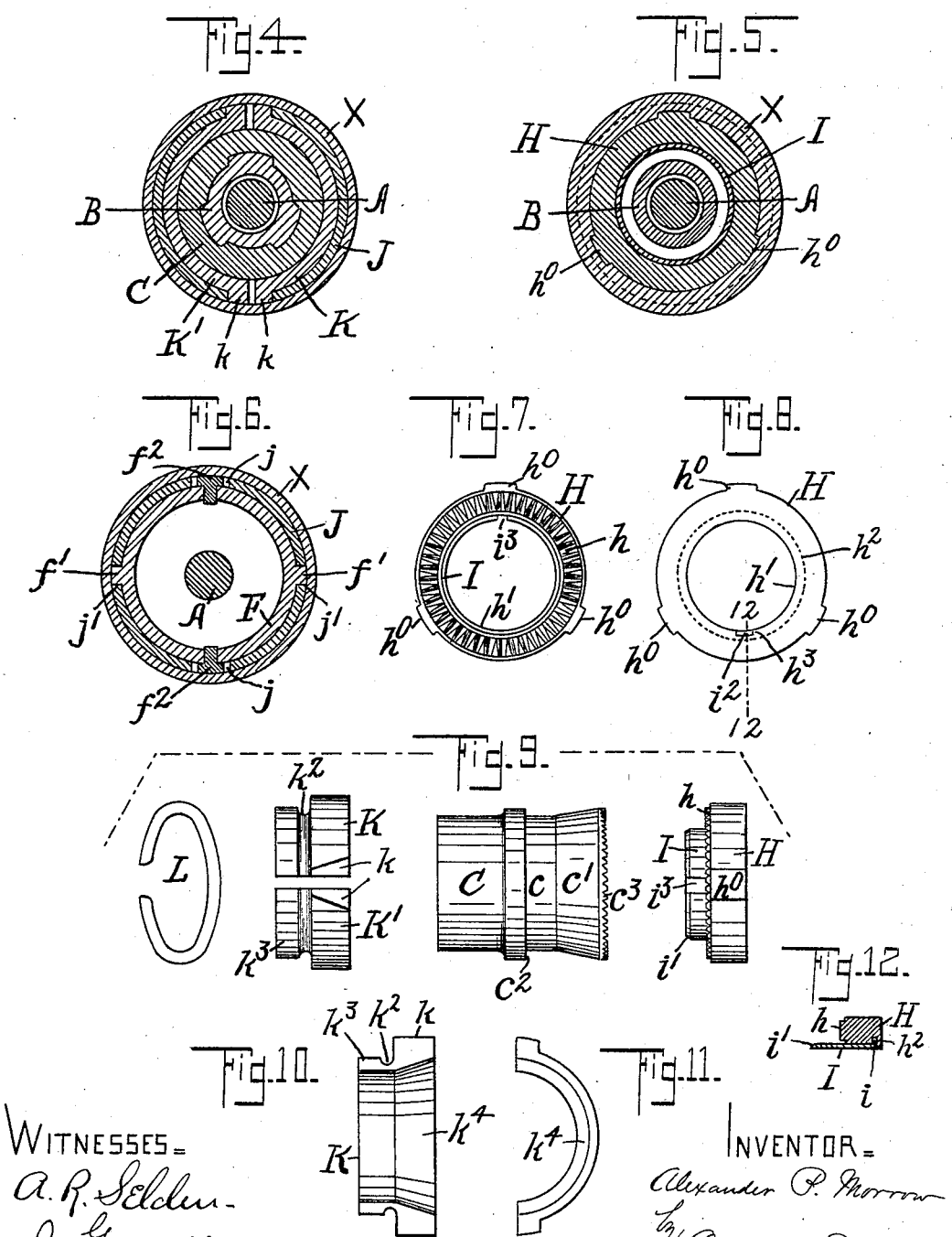

No. 773,333. Patented October 25, 1904.

UNITED STATES PATENT OFFICE.

ALEXANDER P. MORROW, OF ELMIRA, NEW YORK.

COASTER AND BRAKE DEVICE.

SPECIFICATION forming part of Letters Patent No. 773,333, dated October 25, 1904.

Application filed August 1, 1902. Serial No. 118,010. (No model.)

*To all whom it may concern:*

Be it known that I, ALEXANDER P. MORROW, a citizen of the United States, and a resident of Elmira, in the county of Chemung and State of New York, have invented certain new and useful Improvements in Coaster and Brake Devices, of which the following is a specification.

This invention relates to coaster and brake devices, and has for its object to provide an efficient device of few parts and simple construction that is easily assembled and taken apart.

It consists in the device hereinafter described and claimed.

In the drawings, Figure 1 is a longitudinal section of the device. Fig. 2 is an elevation with parts broken away to show the interior construction. Fig. 3 shows the brake-shell. Fig. 4 is a cross-section on the line 4 4 of Fig. 1. Fig. 5 is a cross-section on the line 5 5 of Fig. 1. Fig. 6 is a cross-section on the line 6 6 of Fig. 1. Figs. 7 to 11, inclusive, show parts of the device to be explained hereinafter; and Fig. 12 is a section on the line 12 12 of Fig. 8.

A represents the axle, which is secured within the rear forks of a bicycle-frame in the usual manner. Upon said axle a sleeve B is revolubly mounted, that has upon its exterior surface the thread $b$, which is adapted to mesh with the internal thread $c$ upon a second sleeve C, mounted in turn upon the first sleeve B. The end of the sleeve B terminates in the conical head B', the upper surface of which affords a race for the ball-bearings $b^2$, upon which one end of the hub is supported and the lower surface of which, in conjunction with the nut E on the axle, makes a race for the ball-bearings $b'$, that support that end of the sleeve B upon the axle. A ring $b^3$ and disk $b^4$, set in the sleeve B, are employed to retain the balls $b'$ in place. The sprocket-wheel D is rigidly secured upon the end B' of the sleeve B, being held in place by a lock-nut $d$. On the other end of the axle—that at the left in Fig. 1—a block F is mounted, that in some suitable way is held against rotation, as by an arm G. One end, $g$, of the arm G is represented as cut out, so as to fit upon the squared end $f$ of the block F in the manner indicated in Fig. 1. The other end is secured to the frame of the bicycle in some suitable manner. The arm G is held upon the block F by a nut (not shown) which is screwed upon this end of the axle. This may be the same nut that fastens the axle to the bicycle-frame.

A ring H is locked within the hub X at the end on the right hand of Fig. 1 by lugs $h^0$ upon its periphery, (see Fig. 8,) which enter corresponding grooves in the inner wall of the hub (see Fig. 5) and constitutes a clutch-surface on the hub. This ring, as seen from the left and right, is represented by Figs. 7 and 8, respectively. As represented in Fig. 7, said ring H has clutch-teeth $h$ upon its left-hand face, adapted to engage with teeth $c^3$ upon the face of the sleeve C opposite to it, and is held against longitudinal movement toward the right by the shoulder $b^5$ upon the sleeve B. Said ring H has also an inwardly-projecting flange $h'$ (see Figs. 1 and 7) at the right hand in Fig. 1, whose function will presently appear. A split ring I, that is elastic, so as to be capable of contracting under pressure and of expanding again when released, lies within the ring H. (See Fig. 9.) The ends of this ring I are somewhat separated from each other, as shown by $i^3$ in Fig. 7, so that it may be contracted. The ring I, moreover, has its outer edge $i$—that on the right-hand side in Fig. 1—turned outwardly, so as to enter a groove $h^2$ in the ring H, which latter is just inside the flange $h'$ on said ring H. Said rings H and I are locked against relative rotation by a tongue $i^2$, that enters a slot $h^3$ in the said flange. (See Fig. 8.) The inner edge of the ring I is beveled at $i'$ $i''$ (see Fig. 9) to correspond with an internal beveled face $c^4$ on the sleeve C. The depth that the outwardly-turned edge $i$ of the ring I enters the groove $h^2$ and that the tongue $i^2$ enters the flange $h'$ is such that said edge and said tongue will not be withdrawn from said groove and said slot $h^3$ in said flange, respectively, when said ring I is contracted, and accordingly said rings I and H are always locked together. The ring I projects somewhat beyond the edge of the ring H, so that when the sleeve C is forced inwardly toward the ring H its beveled surface $c^4$ will come into contact with the beveled edge $i'$ on the ring I and will cause said ring I to yield under its pressure and to contract until said sleeve C engages with said ring H. When the pressure is removed from the sleeve C, the resiliency of the ring I causes said ring to expand again to its normal position and in so doing to force the sleeve C back out of engagement with the ring H.

The continuous cylindrical shell J (shown in Fig. 3) is adapted to be expanded out against the inner surface of the hub, and thereby to act as a brake. This cylindrical shell is slotted from each end alternately, as by the slots $j$ and $j'$. In the form shown in the drawings there are two diametrically opposite slots extending from the right-hand end of the shell to near the other end thereof and two other diametrically opposite slots extending from the left-hand end of the shell to near the right-hand end thereof, (see Fig. 3,) the slots being set at suitable distances apart from each other, which in the drawings is represented as about ninety degrees. The slots are flared near their outer ends, as shown in Fig. 3, to receive wedges. The wedges $f'$ $f'$, which lie in the slots $j'$ $j'$, (see Figs. 2 and 6,) that open on the left with reference to Fig. 1, are secured upon the block F. The wedges $k$ $k$ for expanding said shell at the other end by entering the flaring ends of the slots $j$ $j$ at that end of the shell are fixed to an expansible ring K. This ring is represented as divided into two similar parts, each part having secured upon it a half of each of the two wedges, so that when the two divisional parts of the said rings are brought together the halves of the wedges $k$ $k$, respectively, come together, so that they make two wedges that are adapted to enter the said slots $j$ and $j$, respectively. The bore of the two-part ring K is shaped to the cylindrical and conical surface $c$ and $c'$, respectively, of the sleeve C and is held thereon by the spring L, which lies within a groove $k^2$ in said ring (see Fig. 9) and embraces said two parts of said ring and normally holds them with slight friction upon the sleeve C. The shell J is prevented from being withdrawn from the block F and also from turning upon said block by means of the pins $f^2$ $f^2$ in the block F, which lie in the ends of the slots $j$ $j$ in the shell J. The wedges $f'$ $f'$, that lie in the flaring ends of the slots $j''$ $j''$, also hold the shell against turning. The divided ring K is non-revoluble because of its connection with the brake-shell J through the wedges attached to said ring; but the brake-shell J is longitudinally movable toward the left in Fig. 1 with reference to the block F and its wedges $f'$ $f'$, the pins $f^2$ sliding in their respective slots when the shell is moved, and the divided ring K is movable longitudinally in the same direction with reference both to the block F and to shell J. When the said shell J is moved to the left with reference to the block F, the wedges $f'$ $f'$ are forced farther into the flared ends of the slots $j''$ $j''$, respectively, thereby expanding the shell from that end, and when the divided ring K is moved to the left with reference to the shell the divided wedges $k$ $k$ enter farther into the flaring ends of the slots $j$ $j$, respectively, thereby expanding the other end of the shell. The divided ring K is forced to the left by the sleeve C when said sleeve is moved in that direction, and said divided ring in turn forces the shell to the left and upon the wedges $f'$ $f'$. In addition to the expansion of the shell J, caused by the entry of the wedges $k$ $k$ into the slots $j$ $j$, as explained above, the outer inclined surface $c'$ on the sleeve C when forced to the left against the corresponding conical bore $k^4$ of the ring K causes said ring to expand against the resistance of the spring L at the same time that it is forced to the left, as explained above. As the ring K expands, it forces out the right-hand end of the split shell J, and the parts of the wedges K K, engaging with the edges of the said shell in the said slots, pull open the parts of this end of the shell. It is obvious that the same results will follow if the ring K is split instead of divided into parts. Again, the wedges may be either divided or integral, and if divided they may be divided longitudinally in any proportions, provided the parts are upon adjacent ends of the ring. By this construction a large friction-surface on the sleeve C is brought into engagement with the divided ring K to prevent their slipping and at the same time both the longitudinal and the diametrical thrusts produced by the longitudinal movement of the sleeve C against the ring K are employed to expand the ring. The slight friction between the divided ring K and the sleeve C is determined by the tension of the spring L, which may be adjusted to give enough friction to cause certainty of movement of the sleeve C on the sleeve B, but yet not to create a detrimental friction during forward driving. When the sleeve C is moved to the right into engagement with the ring H, as described above, the shoulder $c^2$ will engage with the flange $k^3$ on the ring K and force said ring back to the left till the wedges $k$ $k$ are withdrawn from the slots $j$ $j$ sufficiently for the shell to contract to its normal position.

The hub X is revoluble upon ball-bearings $f^3$, located at each end in raceways formed, respectively, between the collar B' and said hub on the right and the cup F' and the hub on the left. A dust-cap $f^0$ may be employed, as shown.

The operation of the device is as follows: On forward pedaling the sleeve B, actuated by the sprocket-wheel D, moves the screw-threaded sleeve C toward the right. As the sleeve C moves to the right, its beveled surface $c^4$ first engages the beveled edges $i'$ of the ring I and causes said ring to contract within the ring H, as explained above. Next the clutch-teeth $c^3$ upon the sleeve C engage with the teeth $h$ upon the ring H, (the latter being secured to the hub X and retained against longitudinal movement, as explained above,) thus locking together for forward driving the inner sleeve B, the longitudinally-movable sleeve C, and the hub X. If now the sprocket-wheel and the sleeve B are stopped and the hub X continues to rotate, said hub will cause the sleeve C to move longitudinally to the left on the threads of the sleeve B, so that the teeth $c^3$ of the said sleeve C will become disengaged from the teeth $h$ on the ring H within the hub. The elastic ring I, which was contracted by the sleeve C as the latter was forced into engagement with the ring H, will assist in disengaging the teeth $c^3$ from the teeth H and moving said sleeve C longitudinally to the left as soon as pressure is removed from the sleeve C. When sleeve C is disengaged from ring H, the ring I presses lightly against the sleeve C, thus maintaining such disengagement and preventing accidental movement of sleeve C and ring H toward each other. When the several parts are in the position last described, the device is operated as a coaster. If the sprocket-wheel is now rotated backward, the sleeve C will be forced toward the left in Fig. 1, and the inclined surface $c'$ will be forced against the correspondingly-tapered surface $k^4$ in the bore of the ring K. As the sleeve C is forced to the left, so that these surfaces engage one with the other, the ring K is moved longitudinally, so that the wedges $f'$ and $k$ are forced into the left and right ends of the said brake-shell, respectively, as explained above. At the same time, when the parts are apportioned for this purpose, the right-hand end of the shell J is further expanded by the expansion of the brake-ring within that end of the shell. As soon as backward pressure upon the sprocket-wheel ceases the spring action of the shell J and the action of the spring L upon the ring K tends to force said wedges out of the slots and to relieve the hub from the action of the brake. When the sprocket-wheel is again rotated forwardly, the ring K is forced farther out of the slots J by the shoulder $c^2$ of the ring C. The ring K being held against rotation by its connection with the shell J through the wedges $k\ k$ in the slots $j\ j$, respectively, and being held in frictional engagement with the longitudinally-movable sleeve C, as explained above, is also a retarder to prevent said sleeve C from rotating with the sleeve B.

Among the advantages which the device described above has over other such devices is that both the parts that engage for driving and those that engage for expanding the brake-shell are located when disengaged close together, so that a very slight movement of the driving mechanism is required to bring them into engagement. The ring I makes it possible to approach the teeth $c^3$ upon the sleeve C close to the teeth $h'$ upon the ring H when these parts are disengaged without danger that they will work together or be brought together by any jarring to which the device may be subjected, and the spring-encircled ring K is held securely in the position when it is ready to expand the shell J. Again, the device can be quickly and readily assembled. It can be made up into five separate sections that can be easily assembled and taken apart and handled. The first section comprises the axle A, block F, with the wedges $f'\ f'$, cup F', cap $f^0$, brake-shell J, pins $f^2$; the second section consists of the hub X; the third section comprises the sleeve C, the ring K, with the wedges $k\ k$, the spring L; the fourth section comprises the rings H and I, and the fifth section comprises the sleeve B, the sprocket D, the ring $b^3$, the disk $b^4$. These sections are assembled as follows, viz: The ball-bearings $f^3$ are placed in their raceway, and the brake-shell, together with the other parts that comprise the first-mentioned section, is inserted in the hub. The sleeve C, with the other parts that comprise the third-mentioned section, is then inserted within the hub at the other end and placed so that the wedges $k\ k$ lie inside the flaring ends of the slots $j\ j$. Next the ring H is placed in the hub, so that the lugs $h^0$ lie in the corresponding grooves in the inner wall of the hub. Next the sleeve B is screwed into the sleeve C and the ball-bearings $b^2$ placed in their raceway, and, finally, the ball-bearings are placed in their raceway and the nut E is screwed upon the end of the axle. So, too, if it becomes necessary to repair or replace one of the parts of the device it is not necessary to take it all apart; but that particular section of which such part is a member can be readily removed with only such other sections as must be first removed, and none of the other sections besides that which contains the defective part need be taken apart.

What I claim is—

1. In a brake mechanism, the combination of an axle; a revoluble hub upon the axle having a braking-surface; bearings for said hub; a driving member within said hub; means for driving said hub forward by said driving member; a non-revoluble brake-shell within the hub having a longitudinal slot therein open at one end of said shell; a wedge adapted to enter said slot longitudinally and thereby to expand said shell against the braking-surface on the hub; an expansible ring within said brake-shell adapted when moved longitudinally to force said wedge into said slot; and means whereby said ring is moved longitudinally by said driving member on back pedaling so as to force said wedge into said slot and at the same time said ring is expanded, whereby the shell is expanded against said braking-surface.

2. In a brake mechanism, the combination of an axle; a revoluble hub upon the axle having a braking-surface; bearings for said hub; a driving member within said hub; means for driving said hub forward by said driving member; a non-revoluble brake-shell within the hub having a longitudinal slot therein open at one end of said shell; an expansible ring within said brake-shell; a wedge upon said expansible ring adapted to enter said slot in said shell and thereby expand said shell against the braking-surface on the hub; and means whereby said ring is moved longitudinally by said driving member on back pedaling so as to force said wedge into said slot and at the same time said ring is expanded, whereby the shell is expanded against said braking-surface.

3. In a brake mechanism, the combination of an axle; a revoluble hub upon the axle having a braking-surface; bearings for said hub; a driving member within said hub; means for driving said hub forward by said driving member; a non-revoluble brake-shell within the hub having a longitudinal slot therein open at one end of said shell; a divided ring within said brake-shell; a divided wedge upon said divided ring; adapted to enter said slot in said shell and thereby to expand said shell against the braking-surface in the hub; a part of said wedge being attached to each segment of the ring; and means whereby said ring is moved longitudinally by said driving member on back pedaling so as to force said wedge into said slot and at the same time said ring is expanded, whereby the shell is expanded against said braking-surface.

4. In a brake mechanism, the combination of an axle; a revoluble hub upon the axle having a braking-surface; bearings for said hub; a driving member within said hub; means for driving said hub forward by said driving member; a non-revoluble brake-shell within the hub having a longitudinal slot therein open at one end of said shell; a wedge adapted to enter said slot longitudinally, and thereby expand said shell against the braking-surface of the hub; a longitudinally-movable sleeve supported by the axle, having its surface tapered toward the end of the slot in the shell; an expansible ring upon said sleeve, having its bore tapered to correspond with said tapered surface of the sleeve and adapted to operate said wedge; and means for moving said sleeve longitudinally, on back pedaling, whereby the shell is expanded.

5. In a brake mechanism, the combination of an axle, a revoluble hub upon the axle having a braking-surface; bearings for said hub; a driving member within said hub; means for driving said hub forward by said driving member; a non-revoluble brake-shell within the hub having a longitudinal slot therein open at one end of said shell; a longitudinally-movable sleeve supported by the axle, having its surface tapered toward the end of the slot in the shell; an expansible ring upon said sleeve having its bore tapered to correspond with said tapered surface of the sleeve; a wedge upon said expansible ring adapted to enter said slot longitudinally, and thereby to expand the shell against the braking-surface of the hub; and means for moving said sleeve longitudinally, on back pedaling, whereby the sleeve is expanded.

6. In a brake mechanism, the combination of an axle; a revoluble hub upon the axle having a braking-surface; bearings for said hub; a driving member within said hub; means for driving said hub forward by said driving member; a non-revoluble brake-shell within the hub, having a longitudinal slot therein open at one end of said shell; a longitudinally-movable sleeve supported by the axle, having its surface tapered toward the end of the slot in the shell; a ring upon said sleeve, having its bore tapered to correspond with said tapered surface of the sleeve, and having separable portions; a divided wedge upon said expansible ring adapted to enter said slot longitudinally, and thereby to expand the shell against the braking-surface of the hub, the two divisional parts of the wedge being attached to adjacent separable portions of said ring; and means for moving said sleeve longitudinally on back pedaling, whereby the sleeve is expanded.

7. In a brake mechanism, the combination of an axle; a revoluble hub upon the axle having a braking-surface; bearings for said hub; a driving member within said hub; means for driving said hub forward by said driving member; a non-revoluble brake-shell within the hub; a longitudinal slot therein open at one end of said shell; a longitudinally-movable sleeve supported by the axle, having its surface tapered toward the end of the slot in the shell; a divided ring upon said sleeve, having its bore tapered to correspond with said tapered surface of the sleeve; a divided wedge upon said divided ring, adapted to enter said slot in said shell and thereby to expand said shell against the braking-surface on the hub, the two divisional parts of each wedge being attached to adjacent sections of the ring, and means for moving said sleeve longitudinally on back pedaling, whereby the shell is expanded.

8. In a brake mechanism, the combination of an axle; a revoluble hub having a brake-surface; bearings for said hub; a driving member within said hub; means for driving said hub forward by said driving member; a non-revoluble brake-shell within the hub; longitudinal slots therein each open at one end only of said hub; a longitudinally-movable sleeve supported by the axle having its surface tapered toward the end of the slot in the shell; a ring divided into two parts upon said sleeve, having its bore tapered to correspond with said tapered surface of the sleeve; divided wedges upon said divided ring adapted to enter said slot in said shell, and thereby to expand said shell against the braking-surface of the hub, the two divisional parts of each wedge being attached to adjacent sections of the ring; and means for moving said sleeve longitudinally on back pedaling, whereby the shell is expanded.

9. In a brake mechanism, the combination of an axle; a non-revoluble hub upon the axle having a braking-surface; bearings for said hub; a driving member within said hub; means for driving said hub forward by said driving member; a non-revoluble brake-shell within the hub; longitudinal slots therein, open at each end of said shell; a longitudinally-movable sleeve supported by the axle, having its surface tapered toward the end of the slot in the shell; a divided ring K having a tapered bore $k^4$; the divided wedges $k$ upon said divided ring; and means for moving said sleeve longitudinally on back pedaling; whereby the shell is expanded.

10. In a brake mechanism the combination of an axle; a revoluble hub upon the axle having a braking-surface; bearings for said hub; a driving member within said hub; means for driving said hub forward by said driving member; a non-revoluble brake-shell within the hub; a longitudinal slot therein open at one end only of said shell; a longitudinally-movable sleeve supported by the axle having its surface tapered toward the end of the slot in the shell; a divided ring upon said sleeve having its bore tapered to correspond with said tapered surface of the sleeve; a wedge upon said divided ring adapted to enter said slot in said shell, and thereby to expand said shell against the brake-surface of the hub, the two divisional parts of each wedge being attached to adjacent sections of the ring, means for moving said sleeve longitudinally on back pedaling whereby the shell is expanded; and means whereby said wedge is withdrawn from said slot on forward pedaling.

11. In a coaster and brake mechanism, the combination of an axle; a revoluble hub upon the axle having a braking-surface and a clutch-surface; bearings for said hub; a driving member within said hub; a non-revoluble brake-shell within the hub; a longitudinal slot therein open at one end only of said shell; a longitudinally-movable sleeve supported by the axle having its surface tapered toward the end of the slot in the shell, and adapted to engage the clutch-surface of the hub in forward pedaling; a divided ring upon said sleeve having its bore tapered to correspond with said tapered surface of the sleeve; a divided wedge upon said divided ring adapted to enter said slot within said shell, and thereby to expand said shell against the braking-surface of the hub; the two divisional parts of each wedge being attached to adjacent sections of the ring; means connected with the driving mechanism whereby on forward pedaling said sleeve is moved in one direction to clutch the hub, and on back pedaling in the other direction to force the wedges upon said divided ring into the slots to brake said hub, and when held stationary said hub is free to rotate.

12. In a back-pedaling brake and coaster mechanism the combination of an axle; a revoluble hub upon the axle; bearings for said hub; a driving member within said hub; means for driving said hub forward by said driving member; a contractible spring-ring within said hub; a longitudinally-movable sleeve supported by the axle, and means for moving said sleeve longitudinally on forward pedaling, whereby said ring is contracted within said hub by said sleeve when the parts are in position to drive said hub forward.

13. In a back-pedaling brake and coaster mechanism, the combination of an axle; a revoluble hub upon the axle; bearings for said hub; a driving member within said hub; a longitudinally-movable sleeve supported by the axle, and having a conical surface; a contractible spring-ring within said hub adapted to be contracted by said conical surface and means for moving said sleeve longitudinally on forward pedaling, whereby said ring is contracted within said hub by said sleeve when the parts are in position to drive said hub forward.

14. In a back-pedaling brake and coaster mechanism, the combination of an axle; a revoluble hub upon the axle; bearings for said hub; a driving member within said hub; a longitudinally-movable sleeve supported by the axle; a contractible spring-ring in a support attached to the hub and having a flange and a longitudinal lug at one end of said ring and the said support having a retaining groove and notch for said flange and ring; the said spring-ring being contracted by said longitudinally-movable sleeve when the parts are in position for driving the hub forward.

15. In a brake mechanism, the combination of an axle; a revoluble hub upon the axle having a braking-surface; bearings for said hub; a driving member within said hub; means for driving said hub forward by said driving member; a non-revoluble brake-shell within the hub; a longitudinally-movable sleeve revolubly supported upon the axle and movable longitudinally by said driving member to expand said brake-shell; and a non-rotary expansible ring-retarder upon the sleeve and adapted to be expanded thereby.

16. In a brake mechanism, the combination of an axle; a revoluble hub upon the axle having a braking-surface; bearings for said hub; a driving member within said hub; means for driving said hub forward by said driving member; a non-revoluble brake-shell within the hub; a sleeve revolubly supported upon said axle and movable longitudinally by said driving member; an intermediate device between said brake-shell and said sleeve adapted both to engage the brake-shell to expand it and to clutch said sleeve to prevent its rotating; and means for moving said sleeve longitudinally on back pedaling, whereby the intermediate device is caused to engage said brake-shell and to clutch said sleeve.

ALEXANDER P. MORROW.

Witnesses:
 J. C. FERGUSON,
 RALPH D. WEBSTER.